United States Patent
Natarajan et al.

(10) Patent No.: US 10,601,491 B2
(45) Date of Patent: Mar. 24, 2020

(54) PERFORMANCE-BASED ANTENNA SELECTION FOR USER DEVICES

(71) Applicant: Google LLC, Mountain View, CA (US)

(72) Inventors: Vimalkaushik Natarajan, Palatine, IL (US); Gregory Redmond Black, Vernon Hills, IL (US); Vijay L. Asrani, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/844,358

(22) Filed: Dec. 15, 2017

(65) Prior Publication Data

US 2019/0190583 A1    Jun. 20, 2019

(51) Int. Cl.
*H04W 4/00* (2018.01)
*H04B 7/08* (2006.01)
(Continued)

(52) U.S. Cl.
CPC ......... *H04B 7/0808* (2013.01); *H04B 7/0413* (2013.01); *H04B 7/0802* (2013.01); *H04B 7/082* (2013.01); *H04B 7/0814* (2013.01); *H04B 7/0874* (2013.01); *H04B 7/022* (2013.01); *H04B 7/0834* (2013.01)

(58) Field of Classification Search
CPC .... H04B 7/0808; H04B 7/0814; H04B 7/082; H04B 7/022; H04B 7/0834
See application file for complete search history.

(56) References Cited

U.S. PATENT DOCUMENTS

| 5,548,835 A | 8/1996 | Sasaki |
| 9,083,074 B2 | 7/2015 | Ayatollahi et al. |

(Continued)

FOREIGN PATENT DOCUMENTS

| EP | 2355369 | 8/2011 |

OTHER PUBLICATIONS

"International Search Report and Written Opinion", PCT Application No. PCT/US2018/035769, dated Aug. 24, 2018, 13 pages.

(Continued)

*Primary Examiner* — Abdelnabi O Musa
(74) *Attorney, Agent, or Firm* — Colby Nipper PLLC

(57) ABSTRACT

The present disclosure describes apparatuses and methods of performance-based antenna selection for user devices. In some aspects, a user device includes a transceiver having a first receiver, as well as second and third receivers. The transceiver is coupled to a first antenna to enable communication via the first antenna and the second receiver is coupled to the second antenna to enable reception via the second antenna. The third receiver is coupled to a third antenna to enable monitoring of performance of the third antenna. Based on a comparison of respective performance of the first antenna and the third antenna, the first antenna or third antenna is coupled the transceiver to enable subsequent communication. By monitoring and comparing respective performance of the antennas before antenna switching is implemented, a better-performing antenna of the two antennas can be selected for coupling to the transceiver without impacting communication performance.

20 Claims, 8 Drawing Sheets

(51) Int. Cl.
*H04B 7/0413* (2017.01)
*H04B 7/022* (2017.01)

(56) References Cited

U.S. PATENT DOCUMENTS

| | | |
|---|---|---|
| 9,363,005 B2 | 6/2016 | Mahe et al. |
| 2005/0063566 A1 | 3/2005 | Beek et al. |
| 2010/0002912 A1 | 1/2010 | Solinsky |
| 2010/0260082 A1 | 10/2010 | Lum et al. |
| 2011/0105026 A1* | 5/2011 | Hsiao ............... H04B 1/006 455/41.2 |
| 2013/0308608 A1* | 11/2013 | Hu ............... H04B 7/0608 370/334 |
| 2017/0070246 A1* | 3/2017 | Natesan ............... H04B 1/0458 |
| 2017/0365914 A1* | 12/2017 | Hong ............... H01Q 3/24 |
| 2018/0007600 A1* | 1/2018 | Gopal ............... H04B 7/04 |

OTHER PUBLICATIONS

Korphi, et al., "Hyperspectral Data Fusion for Multifactor Face-Based Authentication", Technical Disclosure Commons; Retrieved from https://www.tdcommons.org/dpubs_series/2576, Oct. 17, 2019, 7 pages.

* cited by examiner

PERFORMANCE-BASED ANTENNA SELECTION FOR USER DEVICES

BACKGROUND

Computing or electronic devices often communicate with other devices or access resources via wireless networks. Wireless networks are typically provided and administered by base stations of the network with which a device establishes a connection to receive or transmit information. At a physical level, this information is communicated as signals transmitted or received through an antenna of the device. Performance of the antenna, however, can be degraded due to proximity or contact with objects, such as a hand or head of a user. To mitigate these conditions, some devices include multiple antennas that a radio of the device can switch between when a connection to the base station is impaired.

Switching from one antenna of the device to another, however, may not improve the connection with the base station. For example, a user holding a phone in a particular fashion may partially detune first antenna and completely obscure or detune a second antenna. If the device switches from the first antenna having marginal performance to the second antenna with little or no reception, the connection with the base station may be severely impaired or lost completely. For real-time or latency sensitive applications, such as voice calls or media streams, further impairment or loss of the connection with the base station can affect performance of the application or impact user experience. In some cases, the application may freeze or crash, forcing a user to restart the application once the device returns to the first antenna. As such, switching the radio between antennas of a device may further impair communication performance and negatively affect various device operations.

SUMMARY

The present disclosure describes apparatuses and methods of performance-based antenna selection for user devices. In some aspects, a method couples a transceiver of a device to a first antenna to enable communication via the first antenna. The method may also couple a second receiver (e.g., diversity receiver) of the device to a second antenna to enable reception via the second antenna. A third receiver (e.g., a multiple-input receiver) of the device is coupled to a third antenna to enable monitoring of performance of the third antenna. The method then compares the performance of the third antenna to performance of the first antenna and selects, based on the comparison, the first antenna or the third antenna by which to communicate. The transceiver of the device is then coupled to the antenna that is selected based on performance for subsequent communication.

In other aspects, an apparatus for communicating over a wireless network comprises at least three antennas that include a first antenna, a second antenna, and a third antenna. The apparatus also includes a transceiver having a transmitter and a first receiver, as well as a second receiver, a third receiver, and a diversity controller. The diversity controller is configured to couple the transceiver to the first antenna to enable communication via the first antenna and couple the second receiver to the second antenna to enable reception via the second antenna. The diversity controller couples the third receiver to the third antenna to enable monitoring of performance of the third antenna. The diversity controller then compares the performance of the third antenna to performance of the first antenna and selects, based on the comparison, the first antenna or the third antenna by which to communicate. For subsequent communication, the diversity controller couples the transceiver to the selected antenna such that the transceiver communicates via the antenna selected based on performance.

In yet other aspects, a system-on-chip comprises a transceiver module that includes a transmitter module and a first receiver module, as well as a second receiver module and a third receiver module. The system-on-chip also includes at least one output configured to control radio-frequency (RF) switch circuitry, a processor core, and a hardware-based memory having instructions that, responsive to execution by the processor core, implement a diversity controller. The diversity controller is implemented to cause coupling of the transceiver module to a first antenna to enable communication via the first antenna and cause coupling of the second receiver module to a second antenna to enable reception via the second antenna. The diversity controller also causes coupling of the third receiver module to a third antenna to enable monitoring of performance at the third antenna. Performance of the third antenna is compared by the diversity controller to performance of the first antenna, and the diversity controller selects, based on the comparison, the first antenna or the third antenna by which to communicate. The diversity controller then causes coupling of the transceiver module to the selected antenna to enable the transceiver to communicate via the selected antenna.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the subject matter of the appended claims.

BRIEF DESCRIPTION OF THE DRAWINGS

The details of one or more aspects of performance-based antenna selection are described with reference to the following drawings. The use of same or similar reference numbers throughout the description and the figures may indicate like features or components.

DETAILED DESCRIPTION

Figure 1:
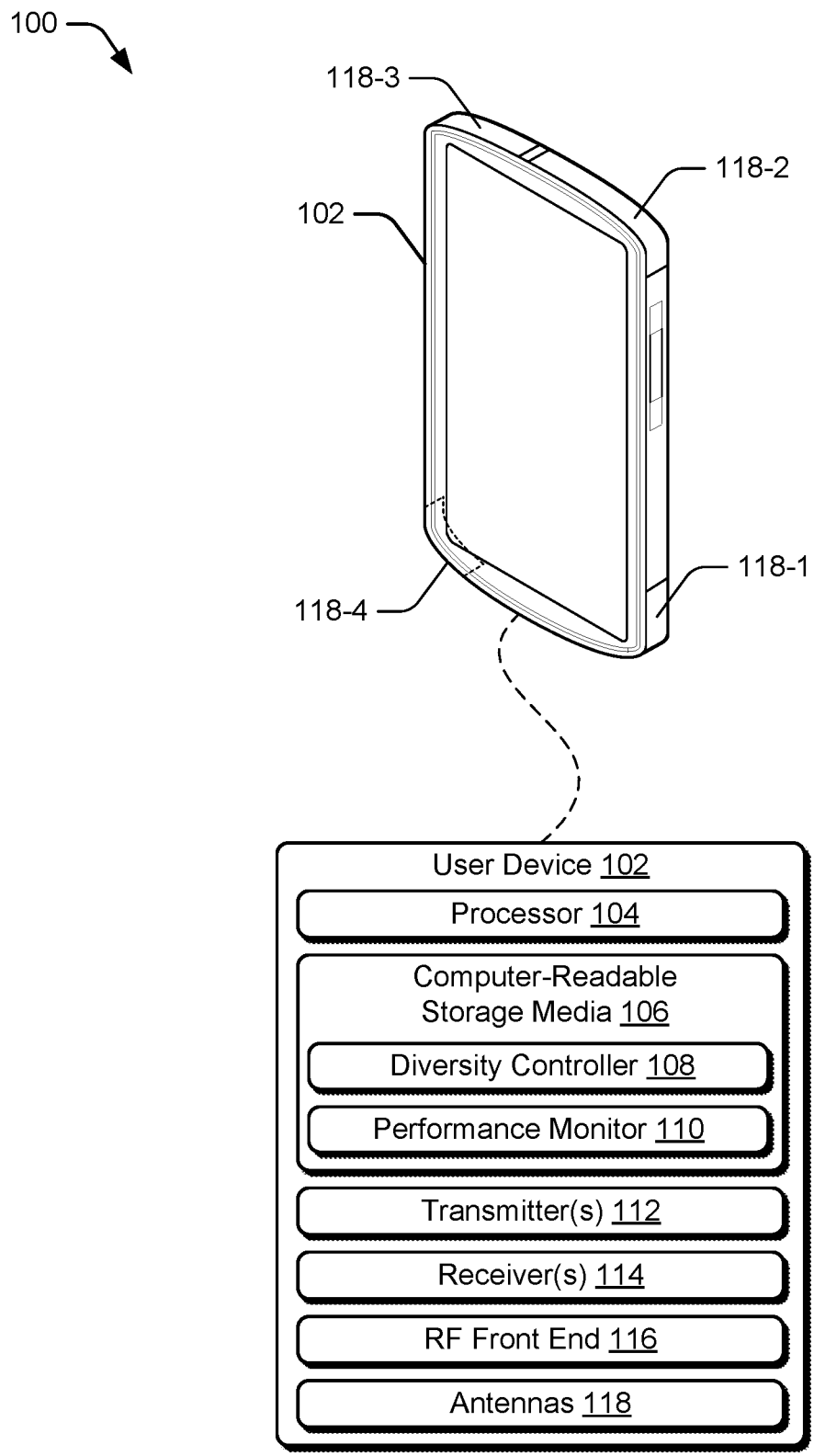
FIG. 1 illustrates an example operating environment that includes a user device having multiple antennas and capable of implementing one or more aspects of performance-based antennas selection.

Conventional techniques for antenna switch diversity in devices with three or more antennas typically implement switching without characterization or knowledge of a previously-inactive antenna's performance. In other words, when a conventional communication controller detects that performance of one antenna is impaired, the communication controller blindly switches a transceiver interface to other antennas of the device until performance improves. Blindly switching to the other antenna, however, may not improve performance as described above when a user or other object has detuned or blocked the other antenna worse than the antenna currently in use. As such, conventional communication controllers often cause further degradation or impairment of communications with a base station when blindly switching through different antennas of the device.

By way of example, consider a device that implements a conventional type of antenna switch diversity with three antennas. Typically, such a device will have a transceiver with a first receiver and a second receiver for diversity reception. In a default state, the transceiver is connected to a first antenna and the second receiver is connected to a second antenna, with the third antenna left unconnected from either receiver. To implement conventional antenna diversity switching, the communication controller sets diversity switches of the device such that the third antenna is connected to the transceiver and the first antenna is disconnected from the transceiver. With the third antenna connected to the transceiver, the communication controller measures performance of the third antenna. If the performance of the third antenna is better than that of the first antenna, then the communication controller leaves the setting of the diversity switches. Alternately, if performance of the third antenna is not better than that of the first antenna, the communication controller restores previous settings of the diversity switches to the default state.

As noted, this conventional antenna diversity switch scheme can be problematic because the third antenna must be connected to the transceiver in order to measure the performance of the third antenna. For example, if a user's hand is positioned against or over the third antenna such that performance is poor (e.g., worse than that of the first antenna), the transceiver is coupled to a poorly performing antenna for the duration of the diversity switch and measurement operations. This may result in the loss of transmit and receive signals of the transceiver, causing a loss of data or interruption of service. For latency sensitive applications, such as voice calls or media streaming, this data loss may cause a voice call to be dropped or freeze a video streaming application.

The present disclosure describes aspects of performance-based antenna selection for user devices. One or more of the described aspects may be implemented to monitor or measure performance of an antenna before the antenna is coupled to a transceiver (e.g., primary transceiver) of a user device. For example, in user devices with three antennas, a third antenna not currently being used for communication can be coupled to a third receiver of the device before diversity switching operations are implemented. In some cases, the third receiver is embodied as part of a multiple-input receiver module or a multiple-input multiple-output (MIMO) receiver module that is idle or not in use while a primary transceiver of the device operates. By monitoring or measuring respective performance of the antennas before the switching operations are implemented, a best-performing antenna can be coupled to the primary transceiver of the device, which may ensure that communication link quality is improved (or at least maintained) through the diversity switch operations.

In some aspects, a multi-antenna user device includes a transceiver having a transmitter and first receiver (e.g., primary receiver), as well as a second receiver and third receiver. In some cases, the third receiver is embodied as part of a multiple-input receiver or MIMO receiver module of the device. The multi-antenna user device also includes at least three antennas and radio-frequency (RF) switching circuitry that enables the antennas to be coupled to two or more of the receivers. A diversity controller of the device couples transceiver to the first antenna to enable communication via the first antenna and couples the second receiver to the second antenna to enable reception via the second antenna. While the first antenna and second antenna may be used to communicate, the third receiver is coupled to a third antenna to enable monitoring of performance of the third antenna. Based on a comparison of respective performance of the first antenna and the third antenna, the first antenna or third antenna is coupled the transceiver to enable subsequent communication. By monitoring and comparing respective performance of the antennas before an antenna switch is implemented, a better-performing antenna of the two antennas can be selected for coupling to the transceiver without impacting communication performance.

The following discussion describes an operating environment, techniques that may be employed in the operating environment, and an electronic device in which components of the operating environment can be embodied. In the context of the present disclosure, reference is made to the operating environment by way of example only.

Operating Environment

FIG. 1 illustrates a user device 102 in which performance-based antenna selection can be implemented. The user device 102 is illustrated as a non-limiting example device and is shown here as a smart-phone. Although illustrated as a smart-phone, the user device 102 may be implemented as any suitable type of device, such as a tablet computer, laptop computer, gaming system, smart-glasses, smart-watch, multimedia dongle, set-top box, vehicle-based computing system, navigation device, home automation device, security system controller, or the like. Note that the user device can be wearable, non-wearable but mobile, or relatively immobile (e.g., broadband router and smart-appliances).

The user device 102 includes one or more computer processors 104 and computer-readable media 106, which may include memory media or storage media. The processor 104 may be implemented as a general-purpose processor (e.g., of a multicore central-processing unit (CPU) or application processor (AP)), an application-specific integrated circuit (ASIC), or a system-on-chip (SoC) with other components of the user device 102 integrated therein. The computer-readable media 106 can include any suitable type of memory media or storage media, such as read-only memory (ROM), programmable ROM (PROM), random access memory (RAM), dynamic RAM (DRAM), static RAM (SRAM), or Flash memory. In the context of this discussion, the computer-readable media 106 is implemented as at least one hardware-based or physical storage device, which does not include transitory signals or carrier waves. Applications, firmware, and/or an operating system (not shown) of the user device 102 can be embodied on the computer-readable media 106 as processor-executable instructions, which may be executed by the processor 104 to provide various functionalities described herein. In this example, the computer-readable media 106 also includes a diversity controller 108 and performance monitor 110, which are described throughout the disclosure.

The user device 102 also includes transmitters 112 and receivers 114, which may be implemented separately or combined as one or more transceivers that are capable of implementing both signal-receiving and -transmitting functions. The transmitters 112 and receivers 114 may be configured to communicate via any suitable type of wireless network, such as a local-area-network (LAN), a wireless local-area-network (WLAN), a personal-area-network (PAN), a wide-area-network (WAN), cellular network, a peer-to-peer network, point-to-point network, a mesh network, and so on. In some aspects, one or more of the transmitters 112 and receivers 114 are configurable to communicate in accordance with a Global System for Mobile Communications (GSM) standard, Third Generation (3G) standard, Worldwide Interoperability for Microwave Access (WiMax) protocol, High Speed Packet Access (HSPA) protocol, Evolved HSPA (HSPA+) protocol, Long-Term Evolution (LTE) standard, LTE Advanced standard, Fifth Generation (5G) standard, or the like.

An RF front end 116 of the user device 102 includes signal conditioning and switching circuitry that enables coupling of various ones of the transmitters 112 and receivers 114 to, or with, antennas 118 of the user device. The RF front end may include any suitable combination of circuitry, such as filters, amplifiers, diplexers, switches, multiplexers, baluns, or the like. The antennas 118 may include any number or type of antennas, which may be positioned on or proximate an outer surface of the user device 102. In this example, the antennas 118 are shown as four separate antennas 118-1 through 118-4 that are located proximate edges and/or corners of the user device 102. Any or all of the antennas 118-1 through 118-4 may be tuned for a single frequency band or multiple frequency bands. For example, one of the antennas 118 may be tuned for multiple frequency bands that range from approximately 700 MHz to 960 MHz, 1.4 GHz to 1.5 GHz, 1.7 GHz to 2.2 GHz, 2.3 GHz to 2.7 GHz, 3.4 GHz to 3.6 GHz, and so on.

Figure 2:
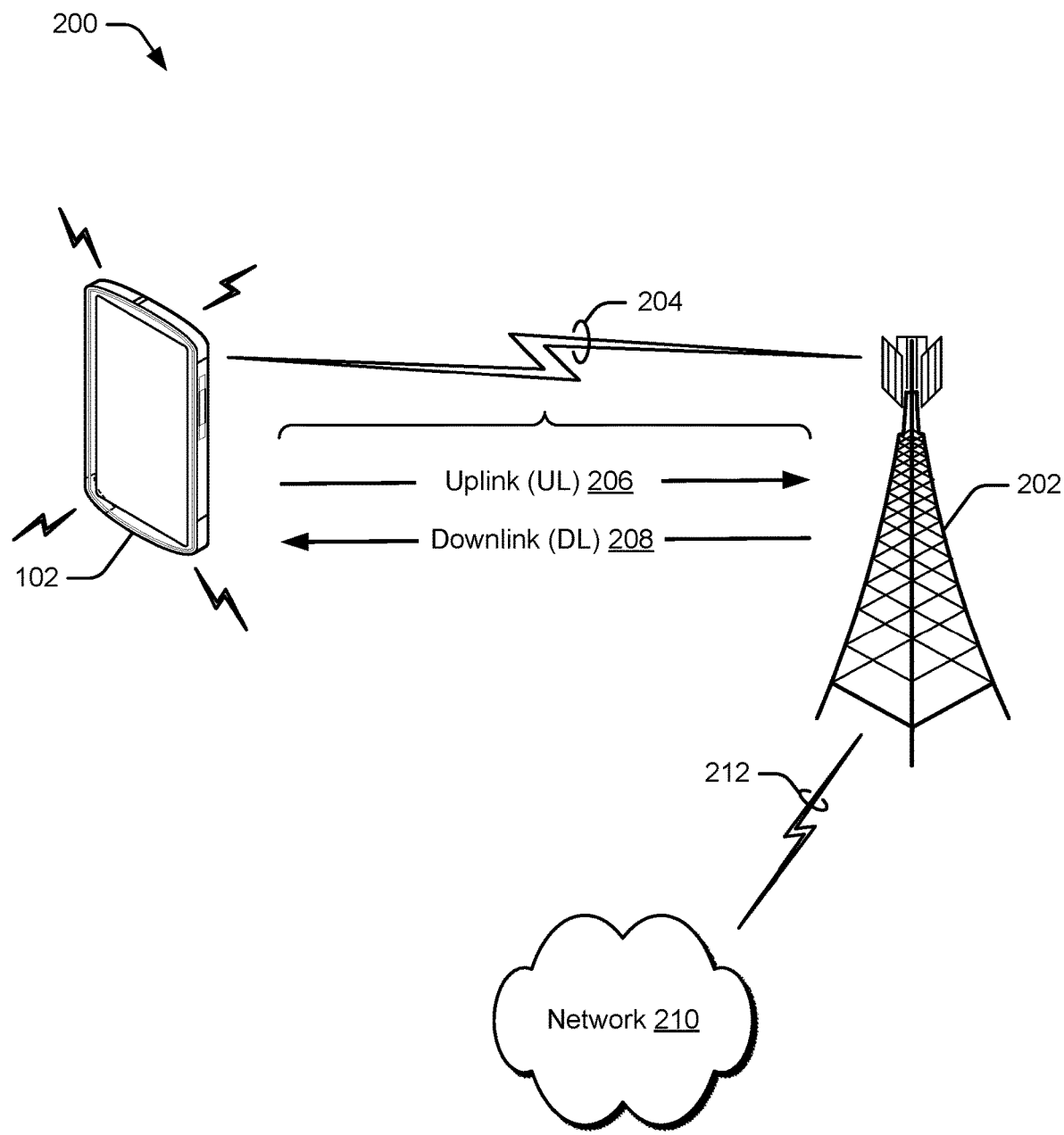
FIG. 2 illustrates an example network environment in which the user device can communicate via a wireless network provided by a base station.

FIG. 2 illustrates an example network environment 200 in which the user device 102 can communicate via a wireless network provided by a base station 202, such as an enhanced Node B of an LTE network. Generally, the user device 102 communicates with the base station 202 via a wireless link 204 established or managed in accordance with various networking protocols or standards. The wireless link 204 may include an uplink 206 by which the user device 102 transmits data or control information to the base station 202 and a downlink 208 by which the base station 202 transmits data or control information to the user device 102. As noted, the wireless link 204 may be implemented in accordance with at least one suitable protocol or standard, such as a GSM standard, a WiMAX standard, an HSPA protocol, an Evolved HSPA protocol, an LTE standard, an LTE-A standard, a 5G standard, any standard promulgated or supported by the 3rd Generation Partnership Project (3GPP), and so forth. Although the wireless link 204 is shown or described with reference to a separate uplink 206 or downlink 208, various types of communications between the user device 102 and the base station 202 may also be referred to as a wireless communication, a wireless connection, a wireless association, a frame exchange, a communication link, or the like.

With reference to the user device 102 and as indicated by the directionality of the uplink 206 and downlink 208, the uplink 206 may include signals transmitted from the user device 102 to the base station 202. Alternately, the downlink 208 may include signals transmitted by the base station 202 for reception by the user device 102. In some aspects, the base station 202 or another base station may transmit downlink signals in a frequency band for which multiple antennas 118 of the user device 102 are configured to operate. As such, the diversity controller 108 of the user device 108 may connect a receiver 114 of the user device 102 to the antenna 118 with optimal reception to improve quality of the wireless link 204 or communication performance. Alternately or additionally, multiple receivers 114 (e.g., primary and diversity receivers) of the user device may be connected to multiple respective antennas 118 such that the multiple receivers 118 can receive a downlink signal.

Generally, the wireless link 204 enables the user device 102 to access resources, other networks, or other devices through the base station 202. As shown in FIG. 2, the base station 202 can provide access to a network 210 (e.g., the Internet) that is connected to the base station via a backhaul link 212 (e.g., a fiber network). As such, applications or functions of the user device 102 may request or access data from the network 210 (e.g., video or voice content), which is received via signals of the downlink 208. With respect to a multi-cell wireless network, the base station 202 may be implemented to realize or manage one cell of the wireless network that includes multiple other base stations that each realize other respective cells of the wireless network. As such, the base station 202 may communicate with a network management entity or other base stations to coordinate connectivity or hand-offs of user devices within or across the cells of the wireless network.

Figure 3:
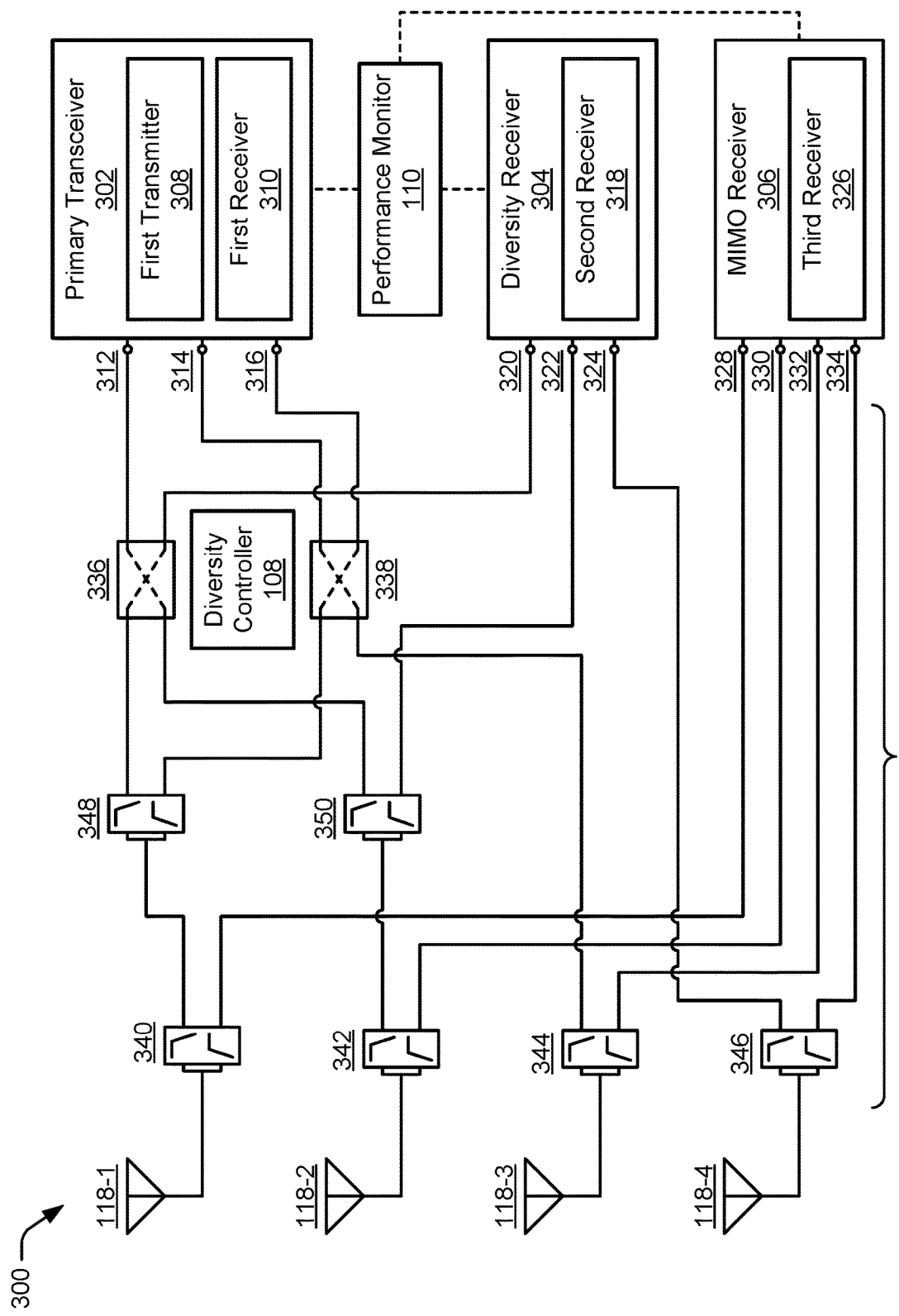
FIG. 3 illustrates an example configuration of a radio-frequency (RF) circuit capable of implementing aspects of performance-based antenna selection.

FIG. 3 illustrates an example configuration of an RF circuit 300 that is capable of implementing aspects of performance-based antenna selection. The components and architecture of RF circuit 300 are presented as a non-limiting example of ways in which performance-based antenna selection can be implemented. As such, the aspects described herein may be applied or extended to any suitable RF circuit to implement various features of performance-based antenna selection. Further any coupling or connection between various components may be direct or indirect, such as made through one or more intervening components. For visual brevity and/or clarity, some unrelated or redundant components (e.g., filters or amplifiers) or circuitry may also be omitted from this or other circuit diagrams. Such an omission is not to be construed as limiting, but rather one example of the many ways in which various aspects of the described circuitry may be used or applied to implement performance-based antenna selection. In other words, the aspects (e.g., circuitry) described herein may also be implemented with any suitable number or combination of filters, amplifiers, and/or additional or separate RF switches.

In this example, a device is implemented with three communication modules that include a primary transceiver 302, a diversity receiver 304, and a multiple-input multiple-output (MIMO) receiver 306, which are coupled to antennas 118 by the RF front end 116. The communication modules may be implemented as separate hardware- or software-based modules, such as blocks or modules of one or more software-defined radios (SDRs). As such, any of the structure or functionality described herein may be provided by or configurable (e.g., for different communication standards or protocols) through execution of firmware or instructions by a processor core of a communication module. Alternately or additionally, each communication module may include, for each port or connection, a respective transmit chain or receive chain and/or additional front end circuitry to process various communication signals (e.g., transmit signals or receive signals).

The primary transceiver 302 includes a first transmitter 308 and a first receiver 310 for communicating data of the device. The primary transceiver 302 can be configured to communicate in multiple frequency bands, and includes a low-band port 312, a mid-band port 314, and a high-band port 316 for transmitting. In some cases, the ports also support reception of a complimentary band such that two of the ports permit the primary transceiver to communicate bi-directionally over a similar or same frequency band. For example, port 314 may also support high-band reception and port 316 may also support mid-band reception.

The diversity receiver 304 includes a second receiver 318 of the device for receiving signals. In some cases, signals or information provided by the diversity receiver 304 are used to enhance or improve reception performance of the primary transceiver 302. As such, the diversity receiver 304 may also be configured for multiband operation and include a low-band port 320, a mid-band/high-band port 322, and a high-band/mid-band port 324. Alternately or additionally, the diversity receiver 304 may include other types of receiver modules, such as a Global Positioning System (GPS) receiver to provide navigational or position data.

To support MIMO communication, the device also includes the MIMO receiver 306 that is implemented as a third receiver 326. The MIMO receiver 306 may support reception of any suitable number of spatial streams, and in this example includes four ports 328 through 334 to receive four respective spatial streams. In aspects of performance-based antenna selection, the MIMO receiver 306 can also be used to monitor or measure performance of an antenna that is not coupled or connected to another receiver. For example, the performance monitor 110 may query the MIMO receiver 306 for an indication of performance for one the antennas 118-1 through 118-4 that is not connected to the primary transceiver 302 or the diversity receiver 304. The MIMO receiver 306 or another receiver may provide or indicate antenna performance with any suitable metric or measurement, such as a received signal strength, receive signal quality, carrier-to-interference ratio, signal-to-noise ratio, bit-error rate, packet-error rate, or the like. Alternately or additionally, the performance monitor 110 may query or poll any or all of the receivers to determine performance indicators or metrics for one or more of the antennas 118.

In some aspects, the MIMO receiver 306 can be enabled or used as a measurement receiver for a minimal amount of time, such as an amount of time that corresponds to detecting a change in user interaction (e.g., a few milliseconds to a few seconds). For example, the MIMO receiver 306 can be used to detect a hand or head of a user moving into or out of near-proximity of one of the antennas 118 that is not connected to the primary receiver 302 or diversity receiver 304. When not employed for MIMO operation or as a measurement receiver, MIMO receiver 306 can be turned off or placed in a low-power state to reduce power consumption.

Generally, the RF front end 116 enables coupling of one or more of the antennas 118 to a respective one of the primary transceiver 302, diversity receiver 304, or MIMO receiver 306. In this example, the RF front end 116 includes double-pole double-throw (DPDT) RF switches 336 and 338, which can be controlled or managed by the diversity controller 108 to implement aspects of performance-based antenna selection. In some cases, the RF switch 336 is configured to couple (or switch) low-band receiver ports between the antennas 118 and the RF switch 338 is configured to couple mid-band and/or high-band receiver ports between the antennas 118. To enable routing of communication signals in or based on different frequency bands, the RF front end 116 includes diplexers 340 through 350 as shown in FIG. 3. In some aspects, the diplexers 340 through 346 are coupled to a respective one of the antennas 118-1 through 118-4 such that high-band or ultra-high-band communication signals are routed to ports 328 through 334 of the MIMO receiver 306. As such, the MIMO receiver 306 may monitor or measure performance of an antenna in a frequency that is different from a frequency for which the antenna is selected for communication. The diplexers 348 and 350 can also be coupled to the RF switches 336 and 338 such that low-band signals communicated through the antennas 118-1 and 118-2 are routable to the primary transceiver 302 and the diversity receiver 304.

In some cases, the diplexers 344 and 350 are coupled to the RF switch 338 such that mid-band and/or high-band signal communicated through either of the antennas 118-1 and 118-3 are routable to the primary transceiver 302. By so doing, the MIMO receiver 306 may be used by the diversity controller 108 and/or the performance monitor 110 to monitor performance of antenna 118-1 or 118-3 while the other of the antennas is coupled to or being used by the primary transceiver 302. This may enable the diversity controller 110 to monitor performance of an antenna before diversity switch operations are implemented, thereby ensuring that communication performance can be maintained or improved by a diversity switch operation based on antenna performance.

Figure 4:
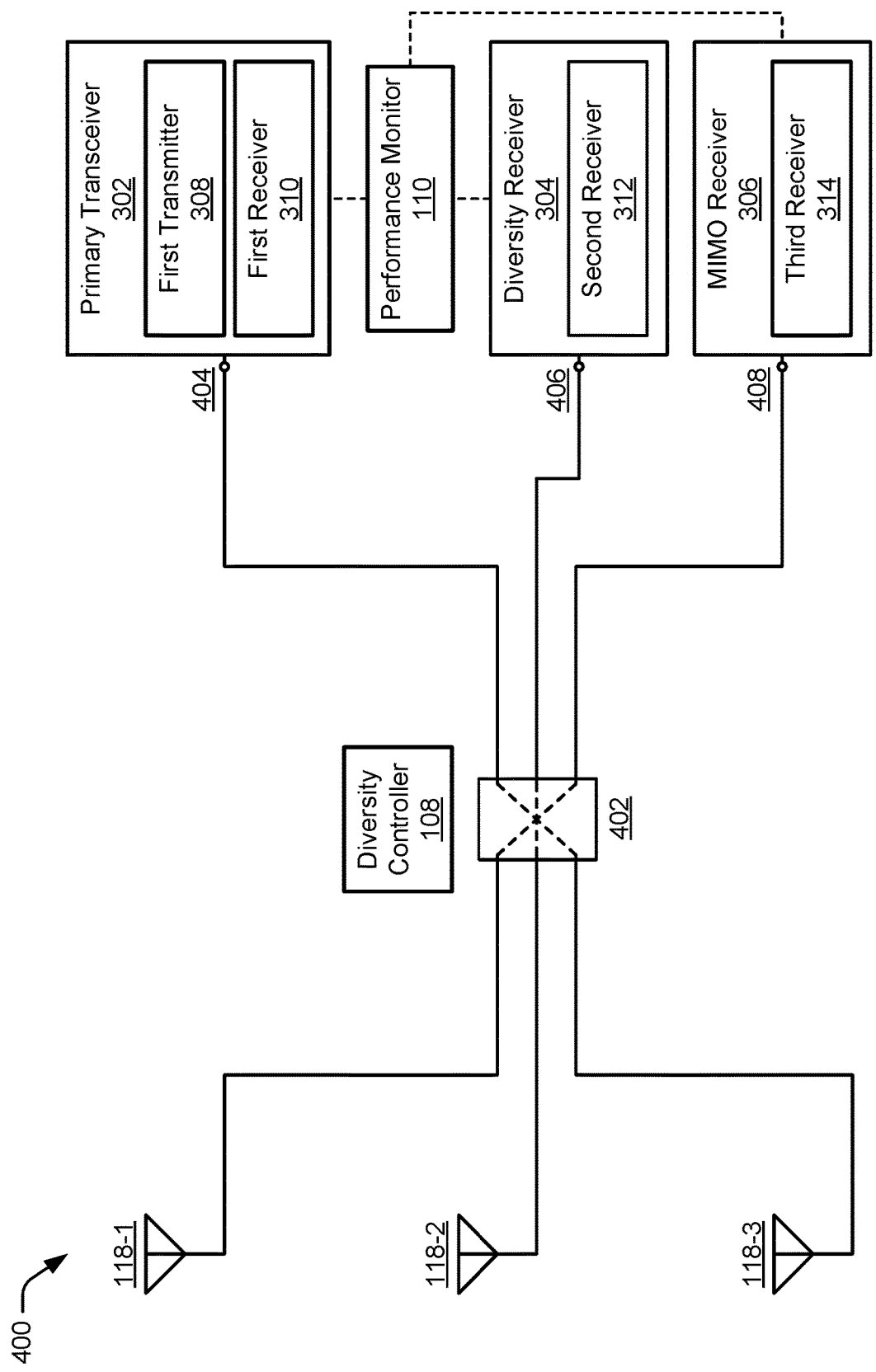
FIG. 4 illustrates another example of an RF circuit capable of implementing aspects of performance-based antenna selection.

FIG. 4 illustrates another example of an RF circuit 400 that is capable of implementing aspects of performance-based antenna selection. In this example, antenna diversity switching is enabled by a triple-pole triple-throw (TPTT) RF switch 402, which is managed or controlled by the diversity controller 108. Although shown in association with entities described with reference to FIG. 1 or FIG. 3, the RF circuit 400 may be implemented with any suitable number and/or combination of components, such as antennas or receivers. As shown in FIG. 4, the RF switch 402 is coupled to the primary transceiver 302 at a port 404, the diversity receiver 304 at a port 406, and the MIMO receiver 306 at a port 408. Each of the ports 404 through 408 may represent a port of a given receiver that is configured to operate over one or more particular frequency bands, such as approximately 700 MHz to 960 MHz, 1.4 GHz to 1.5 GHz, 1.7 GHz to 2.2 GHz, 2.3 GHz to 2.7 GHz, 3.4 GHz to 3.6 GHz, and so on.

In some aspects, the RF switch 402 of the RF circuit 400 enables the diversity controller 108 to couple any of the antennas 118-1 through 118-3 to the primary transceiver 302, the diversity receiver 304, or the MIMO receiver 306. The RF circuit 400 also includes a performance monitor 110 to measure performance of the antenna 118-1, antenna 118-2, and/or antenna 118-3. For example, the performance monitor 110 can monitor a performance of the antenna 118-3 while the primary transceiver 302 is coupled to the antenna 118-1 and the diversity receiver 304 is coupled to the antenna 118-2. The performance monitor 110 may also query or poll the primary transceiver 302 or the diversity receiver 304 for performance indicators associated with the antenna 118-1 or 118-2. To implement performance-based antenna selection, the diversity controller 108 can compare the respective performance of each of the antennas 118-1 through 118-3 and select the antenna 118 with the best performance for coupling to the primary transceiver 302.

Alternately or additionally, the diversity controller 108 can couple the antenna 118 with the next best performance to the diversity receiver 304, and couple the antenna 118 with the lowest performance to the MIMO receiver 306. By so doing, antenna switch diversity can be implemented based on antenna performance to improve communication link quality, such as when one antenna becomes impaired, blocked, detuned, or the like.

Example Methods of Performance-Based Antenna Selection

Figure 5:
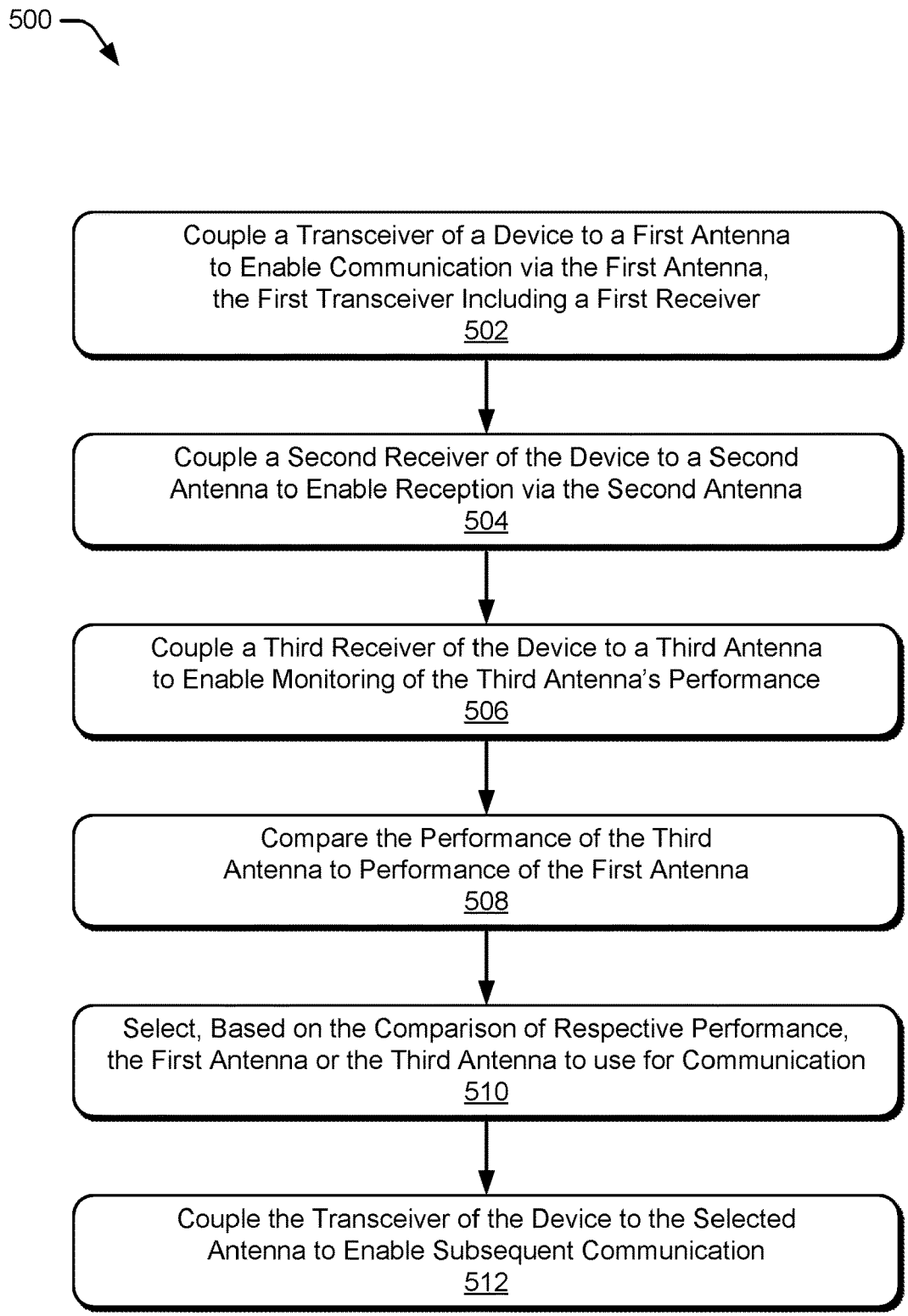
FIG. 5 illustrates an example method for selecting an antenna to use for communication based on performance.
Figure 6:
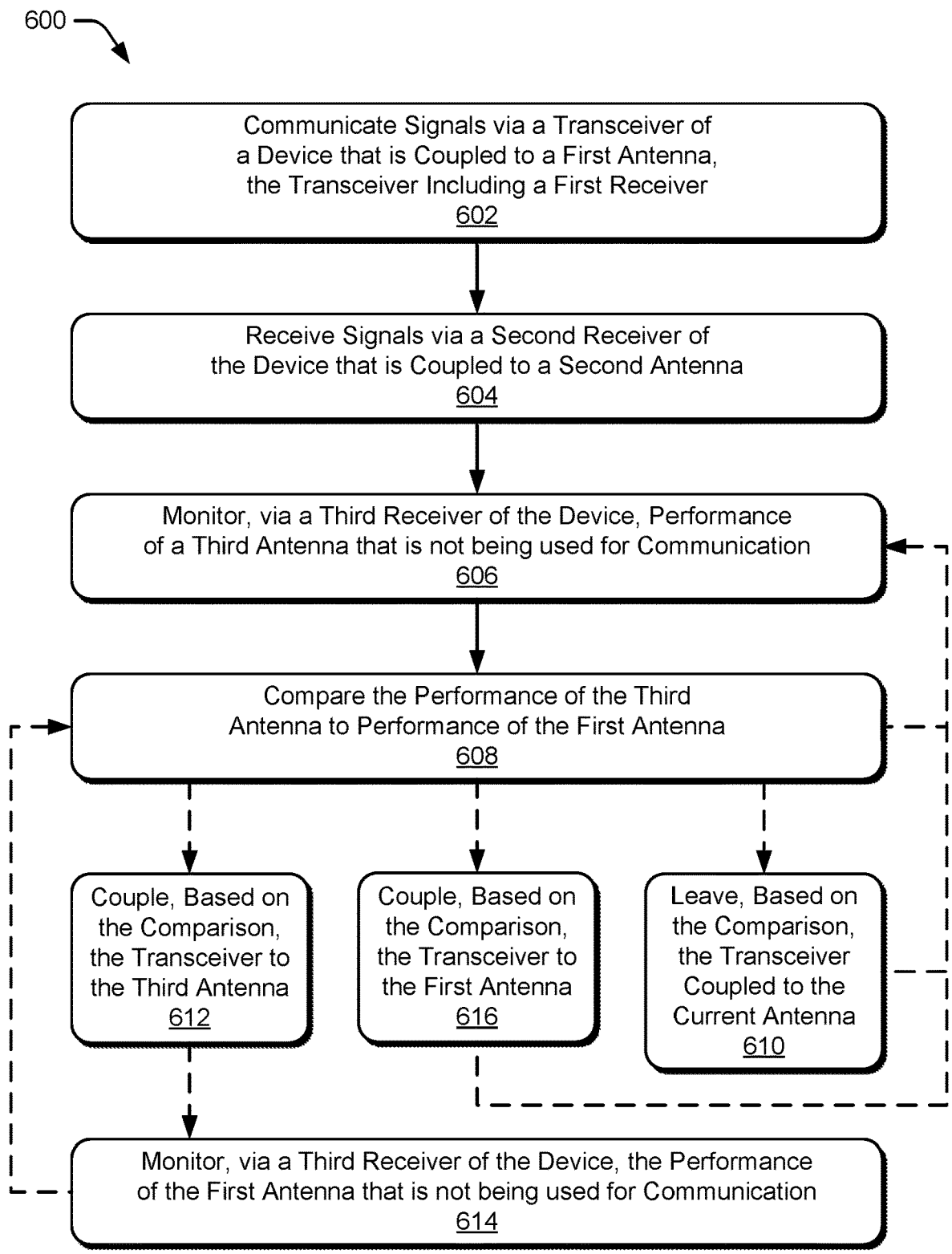
FIG. 6 illustrates an example method for monitoring antenna performance and selecting an antenna based on the monitored performance.
Figure 7:
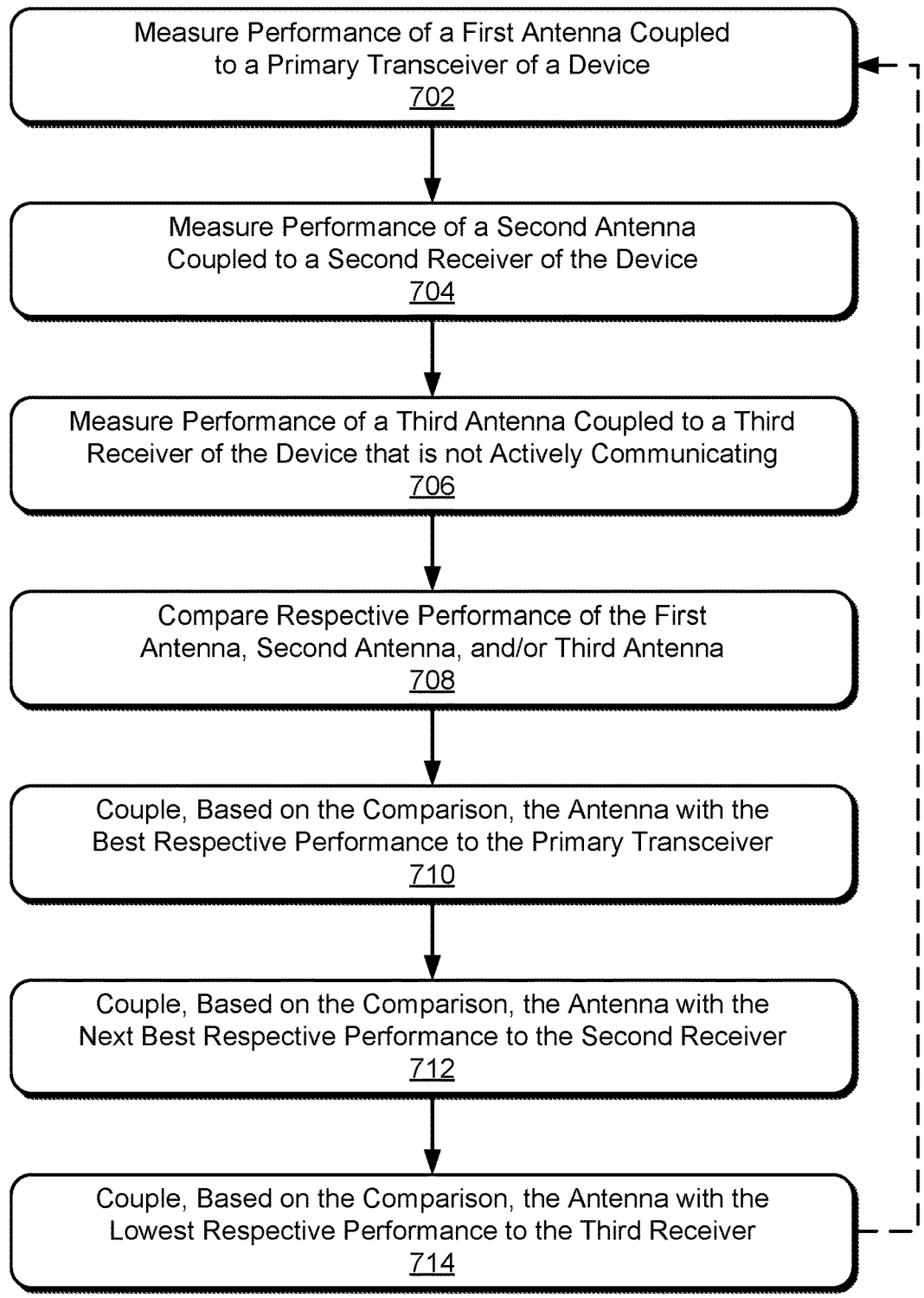
FIG. 7 illustrates an example method for coupling multiple antennas to respective communication modules based on antenna performance.

FIGS. 5-7 depict example methods of performance-based antenna selection for user devices. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the methods (or techniques) may be described with reference to various entities of FIGS. 1-4 or FIG. 8, reference to which is made by way example only. The methods or techniques are not limited to performance by one entity or multiple entities operating on one device, or those described with reference to the figures.

FIG. 5 illustrates an example method 500 for selecting an antenna to use for communication based on performance, including operations performed by the diversity controller 108 and/or performance controller 110. In some aspects, operations of the method 500 may be implemented by a multi-antenna user device to improve quality of a communication link with a base station.

At 502, a transceiver of a device is coupled to a first antenna to enable communication via the first antenna. The transceiver includes a transmitter and a first receiver of the device, and may be implemented as a multiband transceiver module or SDR. In some cases, the transceiver of the device is a primary transceiver that is configured to communicate in accordance with one or more wireless networking standards or protocols. Communication via the first antenna may include the transmission of signals as part of an uplink or the reception of other signals as part of a downlink.

At 504, a second receiver of the device is coupled to a second antenna to enable reception via the second antenna. The second receiver may be a diversity or secondary receiver of the device configured to receive downlink signals in coordination with a first receiver or primary transceiver of the device. In some cases, the second receiver is configured to receive downlink signals in a same or similar frequency band to that of the first receiver. Alternately or additionally, the second receiver may be configured as part of a transceiver or MIMO receiver of the device.

At 506, a third receiver of the device is coupled to a third antenna to enable monitoring of performance of the third antenna. The third receiver may be coupled to the third antenna via a diplexer or RF switch. The third receiver can be implemented as a MIMO receiver that is capable of receiving multiple spatial streams of information. In some cases, the third antenna is coupled to a port of the third receiver that is configured to operate in a frequency band that is different from frequency bands in which another transceiver or receiver of the device is configured to operate. Alternately, the third antenna may be coupled to a port of the third receiver that is configured to operation in a same or similar frequency band as another transceiver or receiver of the device.

At 508, the performance of the third antenna is compared to performance of the first antenna. The performance of the third antenna or the first antenna may be monitored, measured, or received from the third receiver or the first receiver. In some cases, an indication of the performance of the third antenna or the first antenna is received from a performance monitor implemented by the device or a communication module thereof. Alternately or additionally, the performance of the third antenna or the first antenna can be compared with a performance of the second antenna.

At 510, the first antenna or third antenna is selected to use for communication based on the comparison of respective performance. By comparing respective antenna performance, a diversity controller can select the antenna with better performance for subsequent communication. In aspects of performance-based antenna selection, an antenna can be selected for diversity switching before a primary transceiver of a device is disconnected from an antenna. This can be effective to prevent loss of reception due to connecting a transceiver to an antenna with worse performance, which is a common issue with conventional antenna diversity switching.

At 512, the transceiver of the device is coupled to the selected antenna to enable subsequent communication via the selected antenna. The transceiver may be coupled to the selected antenna via any suitable type of circuit or switch, such as a DPDT RF switch or TPTT RF switch. In some cases, coupling the transceiver to the selected antenna is effective to improve quality of a communication link or wireless link. In such cases, improving the quality of the communication link can prevent disruption of data or voice services, thereby enabling user applications or device functions to continue when one antenna of a device is blocked or impaired.

FIG. 6 illustrates an example method 600 for monitoring antenna performance and selecting an antenna based on the monitored performance, including operations performed by the diversity controller 108 and/or performance controller 110. In some aspects, operations of method 600 may be implemented to adaptively connect a primary transceiver of a user device to a best-performing antenna as reception conditions vary.

At 602, signals are communicated via a transceiver of a device that is coupled to a first antenna of the device. The transceiver of the device includes a transmitter and a first receiver of the device, which may be configured as a multiband transceiver for communication in multiple frequency bands. In some cases, the signal communicated include downlink signals and/or uplink signals of a communication link with a base station of a cellular network. Alternately or additionally, the transceiver may measure or characterize performance of the first antenna based on the signals received through the first antenna.

At 604, signals are received via a second receiver of the device that is coupled to a second antenna of the device. The signals received via the second antenna may be the same or part of the signals received via the first antenna. In other words, the second receiver can be implemented as a diversity receiver for communications of a primary transceiver to improve communicative performance of the device. Alternately or additionally, the second receiver may be implemented as part of another transceiver or a MIMO receiver of the device.

At 606, performance of a third antenna is monitored via a third receiver of the device that is coupled to the third antennas and not communicating. In some communication configurations, the third antenna and/or the third receiver are not actively involved in the transmission or reception of signals. For example, a device use the transceiver and second receiver to communicate with a base station while the third antenna, or diplexer output associated with the third antenna, is not connected to transceiver or second receiver. In such cases, the third receiver can be used to monitor or measure performance of the third antenna, such as before diversity switch operations are to occur. During other times, such as when not monitoring or measuring, the third receiver can be turned off, disabled, or placed in a reduced-power state (e.g., idle or sleep state) to conserve power. Alternately or additionally, the third receiver may be implemented as part of another transceiver (e.g., with a transmitter) or a MIMO receiver of the device.

At 608, performance of the third antenna is compared to performance of the first antenna. The performance of the third antenna or the first antenna may be monitored, measured, or received from the third receiver or the first receiver. In some cases, an indication of the performance of the third antenna or the first antenna is received from a performance monitor implemented by the device or a communication module thereof. Alternately or additionally, the performance of the third antenna or the first antenna can be compared with a performance of the second antenna. In some aspects, the operations of 608 and 606 are repeated to implement a hysteresis type of measurement. For example, the first antenna may be preferred or favored over the inactive third antenna when respective performance is approximately the same or similar. In such cases, antenna switching may be implemented when a delta in respective performance exceeds a predefined threshold, which can be effective to prevent excessive antenna switching operations.

Optionally at 610, the method 600 leaves the transceiver coupled to the first antenna based on the comparison of respective antenna performance. When the performance of the first antenna is better than the performance of the third antenna, leaving the transceiver coupled to the first antenna may prevent further degradation or disruption of a wireless connection. From operation 610, the method 600 may return to operation 606 to continue to monitor the performance of the third antenna with the third receiver, such as until performance of the third antenna exceeds that of the first antenna.

Optionally at 612, the transceiver of the user device is coupled to the third antenna based on the comparison of respective antenna performance. When the performance of the third antenna equals or exceeds the performance of the first antenna, coupling the transceiver to the third antenna may improve quality of a wireless connection with a base station. From operation 612, the method 600 may proceed to 614, at which performance of the first antenna is monitored via the third receiver of the device. While the transceiver is coupled to the third antenna, the third receiver may be used to monitor the performance of the first antenna, such as until the performance of the first antenna exceeds that of the third antenna. From operation 614, the method 600 may return to operation 608 to compare respective performance of the third antenna coupled to the transceiver and the first antenna coupled to the third receiver.

From operation 608, the method 600 may then proceed to operation 616 based on the comparison of the performance of the third antenna and performance of the first antenna. For example, if a determination is made that the first antenna coupled to the third receiver has or provides better performance than the third antenna, the transceiver can be coupled to the first antenna. Alternately or additionally, the method 600 can also return to operation 606 to monitor the performance of the third antenna using the third receiver. In some cases, the third receiver is recoupled to the third antenna to enable monitoring of the performance of the third antenna.

FIG. 7 illustrates an example method for coupling multiple antennas to respective communication modules based on antenna performance, including operations performed by the diversity controller 108 and/or performance controller 110. In some aspects, operations of method 700 may be implemented to optimize communication performance of a multi-antenna user device.

At 702, performance of a first antenna coupled to a primary transceiver of a device is measured. The performance of the first antenna may be measured based on a quality or strength of downlink signals received from a base station. In some cases, the primary transceiver is queried or polled for performance metrics associated with the first antenna. For example, a performance monitor or diversity controller of the device may request the performance metrics before initiating diversity antenna switching operations.

At 704, performance of a second antenna coupled to a second receiver of the device is measured. The performance of the second antenna may also be measured based on a quality or strength of downlink signals received from a base station. In some cases, the second receiver is queried or polled for performance metrics associated with the first antenna.

At 706, performance of a third antenna coupled to third receiver of the device is measured. This receiver may be inactive or not actively communicating data, such as a multiple-input receiver or MIMO transceiver that is idle. Alternately, the third receiver may measure or provide an indication of the performance of the third antenna based on MIMO communications received by the third receiver.

At 708, respective performance of the first antenna, second antenna, and/or third antenna is compared. The respective performance of all three antennas may be compared to determine which antenna provides the best performance, which antenna provides the next best performance, and which antenna provides the lowest level of performance. When metrics or an indication of performance is not available for a particular antenna, operation 708 may proceed with a comparison of respective performance for two of the three antennas. Alternately or additionally, operation 708 may omit or skip a comparison of performance for an antenna having lost a wireless link or downlink signal, such as to save time and energy for a known low performance antenna.

At 710, the antenna with the best respective performance is coupled to the primary transceiver of the device. The primary transceiver may be coupled to the selected antenna via any suitable type of circuit or switch, such as a DPDT RF switch or TPTT RF switch. In some cases, coupling the transceiver to the best-performing antenna is effective to improve quality of a communication link or wireless link. In such cases, improving the quality of the communication link can prevent disruption of data or voice services, thereby enabling user applications or device functions to continue when one antenna of a device is blocked or impaired.

At 712, the antenna with the next best respective performance is coupled to the second receiver of the device. The second receiver can be coupled to the next best-performing antenna via any suitable type of circuit or switch, such as a DPDT RF switch or TPTT RF switch. In some cases, coupling the second receiver to the next best-performing antenna is effective to improve diversity reception of the device.

At 714, the antenna with the lowest respective performance is coupled to the third receiver of the device. The antenna with the lowest performance may be coupled to the third receiver via any suitable type of circuit or switch, such as a DPDT RF switch or TPTT RF switch. In some aspects, coupling the antenna to the third receiver, such as a MIMO receiver, enables performance of the antenna to be monitored while other antennas are used for communication. Alternately, the third receiver can be disabled, powered down, or placed in a low-power state to conserve power of the device. From operation 714, the method 700 may return to operation 702 to continue the various operations of measurement, comparison, and/or coupling for implementing one or more aspects of performance-based antenna selection.

Example Electronic Device

Figure 8:
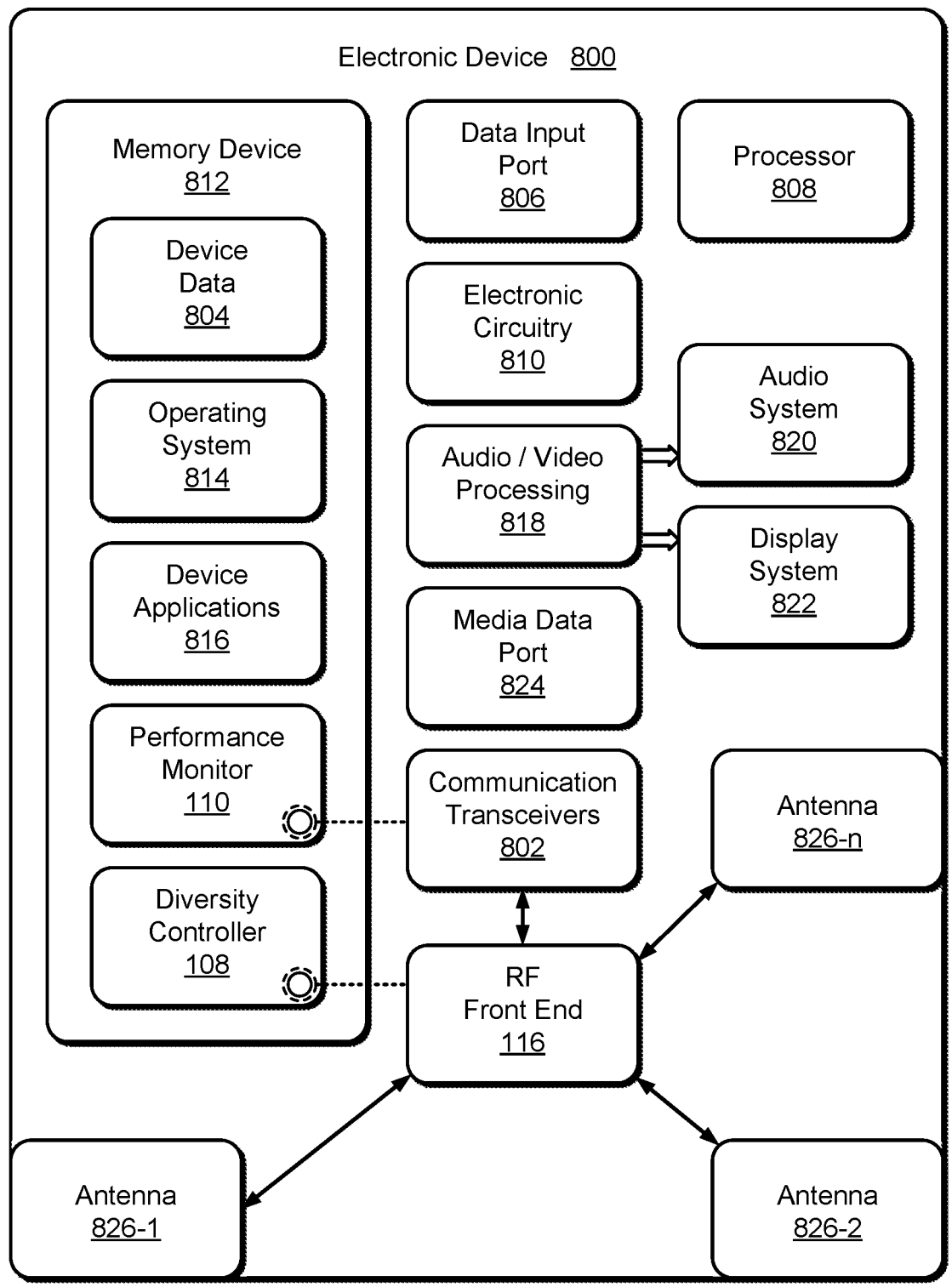
FIG. 8 illustrates an exemplary configuration of an electronic device in which techniques of performance-based antenna selection may be implemented.

FIG. 8 illustrates various components of an example electronic device 800 that can implement performance-based antenna selection in accordance with one or more aspects as described with reference to any of the previous FIGS. 1-7. The electronic device 800 may be implemented as any one or combination of a fixed or mobile device, in any form of a consumer, computer, portable, user, server, communication, phone, navigation, gaming, audio, camera, messaging, media playback, and/or other type of electronic device or a base station device. For example, the electronic device 800 may be implemented as a smart-phone, phone-tablet (phablet), laptop computer, set-top box, wireless drone, vehicle-based computing system, or wireless broadband router.

The electronic device 800 includes communication transceivers 802 that enable wired and/or wireless communication of device data 804, such as received data, transmitted data, or other information as described above. Example communication transceivers 802 include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers. In some aspects, multiple communication transceivers 802 or components thereof are operably coupled with an instance of an RF front end 116 embodied on the electronic device 800. The RF front end 116 of the electronic device 800 may be implemented similar to or differently from an RF front end 116 as described with reference to FIGS. 1-7.

The electronic device 800 may also include one or more data input ports 806 via which any type of data, media content, and/or other inputs can be received, such as user-selectable inputs, messages, applications, music, television content, recorded video content, and any other type of audio, video, and/or image data received from any content and/or data source. The data input ports 806 may include USB ports, coaxial cable ports, and other serial or parallel connectors (including internal connectors) for flash memory, DVDs, CDs, and the like. These data input ports 806 may be used to couple the electronic device to components, peripherals, or accessories such as keyboards, microphones, or cameras.

The electronic device 800 of this example includes at least one processor 808 (e.g., one or more application processors, processor cores microprocessors, digital-signal processors (DSPs), controllers, and the like), which can include a combined processor and memory system (e.g., implemented as part of an SoC), that executes computer-executable instructions stored on computer-readable media to control operation or implement functionalities of the device. Generally, a processor or processing system may be implemented at least partially in hardware, which can include components of an integrated circuit or on-chip system, a DSP, an application-specific integrated circuit (ASIC), a field-programmable gate array (FPGA), a complex programmable logic device (CPLD), and other implementations in silicon and/or other hardware.

Alternately or additionally, the electronic device 800 can be implemented with any one or combination of electronic circuitry 810, which may include hardware, fixed logic circuitry, or physical interconnects (e.g., traces or connectors) that are implemented in connection with processing and control circuits. This electronic circuitry 810 can implement executable or hardware-based modules (not shown) through logic circuitry and/or hardware, such as an FPGA or CPLD. Although not shown, the electronic device 800 may also include a system bus, interconnect fabric, crossbar, or data transfer system that couples the various components within the device. A system bus or interconnect fabric can include any one or combination of different bus structures or IP blocks, such as a memory bus, memory controller, a peripheral bus, a universal serial bus, interconnect nodes, and/or a processor or local bus that utilizes any of a variety of bus architectures.

The electronic device 800 also includes one or more memory devices 812 that enable data storage, examples of which include random access memory (RAM), non-volatile memory (e.g., read-only memory (ROM), flash memory, EPROM, and EEPROM), and a disk storage device. Any or all the memory devices 812 may enable persistent and/or non-transitory storage of information, data, or code, and thus do not include transitory signals or carrier waves in the general context of this disclosure. For example, the memory device(s) 812 provide data storage mechanisms to store the device data 804 and other types of data (e.g., user data). The memory device 812 may also store an operating system 814, firmware, and/or device applications 816 of the electronic device as instructions, code, or information. These instructions or code can be executed by the processor 808 to implement various functionalities of the electronic device, such as to provide a user interface, enable data access, or manage connectivity with a wireless network. In this example, the memory device 112 also stores processor-executable code or instructions for providing respective instance of a diversity controller 108 and performance monitor 110, which may be implemented similar to or differently from the diversity controller and/or performance monitor described with reference to FIGS. 1-7.

As shown in FIG. 8, the electronic device 800 may include an audio and/or video processing system 818 for processing audio data and/or passing through the audio and video data to an audio system 820 and/or to a display system 822 (e.g., a video buffer or device screen). The audio system 820 and/or the display system 822 may include any devices that process, display, and/or otherwise render audio, video, graphical, and/or image data. Display data and audio signals can be communicated to an audio component and/or to a display component via an RF link, S-video link, HDMI (high-definition multimedia interface), Display Port, composite video link, component video link, DVI (digital video interface), analog audio connection, or other similar communication link, such as media data port 824. In some implementations, the audio system 820 and/or the display system 822 are external or separate components of the electronic device 800. Alternately, the display system 822 can be an integrated component of the example electronic device 800, such as part of an integrated display with touch interface.

The electronic device 800 also includes antennas 826-1, 826-2, through 826-*n*, where n may be any suitable number of antennas. The antennas 826-1 through 826-*n* are coupled to the RF front end 116 of the electronic device 800, which may include any suitable combination of filters, amplifiers, switches, diplexers, and/or multiplexers to facilitate transmission or reception of signals by the communication transceivers 802 through of the antennas 826-1 through 826-*n*. In some aspects, the diversity controller 108 or performance monitor 110 may interact with the RF front end 116 and the antennas 826-1 through 826-*n* to implement performance-based antenna selection as described herein. Alternately or additionally, the electronic device 800 may represent an example implementation of the user devices 102 as described throughout the present disclosure. Thus, in some cases the processor 808 is an example of the processor 104 (not shown) and/or the memory device 812 is an example of the computer-readable storage medium 106 (not shown) for storing various data, instructions, or code for implementing a diversity controller or other applications. As such, aspects of performance-based antenna selection as described herein can be implemented by, or in conjunction with, the electronic device 800 of FIG. 8.

Although various implementations of performance-based antenna selection for user devices have been described in language specific to certain features, structures, and/or methods, the subject matter of the appended claims is not necessarily limited to the specific features or methods described. Rather, the specific features and methods are disclosed as example ways in which performance-based antenna selection for user devices can be implemented.

What is claimed is:

1. A method performed by a user device having at least three antennas, the method comprising:
    coupling a transceiver of the device to a first antenna to enable communication via the first antenna, the transceiver including a first receiver;
    coupling a second receiver of the device to a second antenna to enable reception via the second antenna;
    coupling a third receiver of the device to a third antenna to enable monitoring of receive performance of the third antenna;
    receiving, via the transceiver and first antenna, a signal transmitted by a base station of a wireless network;
    measuring, based on the signal received via the first antenna, receive performance of the first antenna;
    receiving, via the second receiver and second antenna, the signal transmitted by the base station the wireless network;
    measuring, based on the signal received via the second antenna, receive performance of the second antenna;
    measuring, via the third receiver, the receive performance of the third antenna based on the signal transmitted by the base station, the third receiver not being used for communication with the base station of the wireless network;
    comparing respective receive performances of the first antenna, second antenna, and third antenna;
    coupling, based on the comparison of respective receive performance, the antenna with a best respective receive performance to the transceiver of the device to enable subsequent communication via the antenna with the best receive performance;
    coupling, based on the comparison of respective receive performance, the antenna with a next best respective receive performance to the second receiver to enable the second receiver to receive subsequently transmitted signals via the antenna with the next best respective receive performance; and
    coupling, based on the comparison of respective receive performance, the antenna with a lowest respective receive performance to the third receiver.

2. The method as recited by claim 1, wherein the respective receive performance of the first antenna, the second antenna, or the third antenna is measured as at least one of received signal strength, receive signal quality, carrier-to-interference ratio, signal-to-noise ratio, bit-error rate, or packet-error rate.

3. The method as recited by claim 1, wherein:
    the transceiver of the device includes a primary transmitter and the first receiver is a primary receiver;
    the second receiver of the device is a diversity receiver; and
    the third receiver of the device is a multiple-input receiver having at least two inputs that support reception of at least two respective spatial streams of information.

4. The method as recited by claim 3, wherein the multiple-input receiver is implemented as part of a multiple-input multiple-output (MIMO) transceiver that includes at least two outputs that support transmission of at least two respective spatial streams of other information.

5. The method as recited by claim 1, wherein the respective receive performance of the first antenna or the second antenna is measured in a first frequency band and the respective receive performance of the third antenna is measured in a second frequency band, the first frequency band being different from the second frequency band.

6. The method as recited by claim 1, wherein the respective receive performance of the first antenna, the second antenna, and the third antenna is measured in a same frequency band.

7. An apparatus for communicating over a wireless network comprising:
    at least three antennas that include a first antenna, a second antenna, and a third antenna;
    a transceiver that includes a transmitter and a first receiver;
    a second receiver;
    a third receiver; and
    a diversity controller configured to:
        couple the transceiver to the first antenna to enable communication via the first antenna;
        couple the second receiver to the second antenna to enable reception via the second antenna;
        couple the third receiver to the third antenna to enable monitoring of receive performance of the third antenna;
        receive, via the transceiver and first antenna, a signal transmitted by a base station of a wireless network;
        measure, based on the signal received via the first antenna, receive performance of the first antenna;
        receive, via the second receiver and second antenna, the signal transmitted by the base station of the wireless network;
        measure, based on the signal received via the second antenna, receive performance of the second antenna;
        measure, via the third receiver, the receive performance of the third antenna based on the signal transmitted by the base station of the wireless network, the third receiver not being used for communication with the base station;
compare respective receive performances of the first antenna, second antenna, and third antenna;
couple, based on the comparison of respective receive performance, the antenna with a best respective receive performance to the transceiver of the apparatus to enable the transceiver to communicate via the antenna with the best respective receive performance;
couple, based on the comparison of respective receive performance, the antenna with a next best respective receive performance to the second receiver to enable the second receiver to receive subsequently transmitted signals via the antenna with the next best respective receive performance; and
couple, based on the comparison of respective receive performance, the antenna with a lowest respective receive performance to the third receiver.

8. The apparatus as recited by claim 7, further comprising a fourth antenna and wherein the third receiver is configured as a multiple-input receiver to support reception of four spatial streams via the first antenna, second antenna, third antenna, and fourth antenna.

9. The apparatus as recited by claim 7, wherein the transceiver is a first transceiver of the apparatus and the third receiver is embodied as part of a second transceiver of the apparatus.

10. The apparatus as recited by claim 7, further comprising a double-pole double-throw (DPDT) radio-frequency (RF) switch that includes:
a first terminal coupled to the first antenna;
a second terminal coupled to the third antenna;
a third terminal coupled to the transceiver; and
a fourth terminal coupled to the third receiver.

11. The apparatus as recited by claim 10, further comprising:
a first diplexer coupled between the first antenna and the first terminal of the DPDT RF switch; and
a second diplexer coupled between the third antenna and the second terminal of the DPDT RF switch.

12. The apparatus as recited by claim 11, further comprising:
a third diplexer coupled between the first diplexer and the first terminal of the DPDT RF switch; or
a fourth diplexer coupled between the second diplexer and the second terminal of the DPDT RF switch.

13. The apparatus as recited by claim 11, wherein:
a low frequency port of the first diplexer is coupled to the first terminal of the DPDT RF switch; and
a low frequency port of the second diplexer is coupled to the second terminal of the DPDT RF switch.

14. The apparatus as recited by claim 7, further comprising a triple-pole triple-throw (TPTT) RF switch that includes:
a first terminal coupled to the first antenna;
a second terminal coupled to the third antenna;
a third terminal coupled to the transceiver; and
a fourth terminal coupled to the third receiver.

15. The apparatus as recited by claim 14, wherein:
a fifth terminal of the TPTT RF switch is coupled to the second antenna; and
a sixth terminal of the TPTT RF switch is coupled to the second receiver.

16. A system-on-chip comprising:
a transceiver module that includes a transmitter module and a first receiver module;
a second receiver module;
a third receiver module;
at least one output configured to control radio-frequency (RF) switch circuitry;
a processor core configured to execute processor-executable instructions;
a hardware-based memory having processor-executable instructions stored thereon that, responsive to execution by the processor core, implement a diversity controller to:
cause, via the at least one output, coupling of the transceiver module to a first antenna to enable communication via the first antenna;
cause, via the at least one output, coupling of the second receiver module to a second antenna to enable reception via the second antenna;
cause, via the at least one output, coupling of the third receiver module to a third antenna to enable monitoring of receive performance of the third antenna;
receive, via the transceiver module and first antenna, a signal transmitted by a base station of a wireless network;
measure, based on the signal received via the first antenna, receive performance of the first antenna;
receive, via the second receiver module and second antenna, the signal transmitted by the base station of the wireless network;
measure, based on the signal received via the second antenna, receive performance of the second antenna;
measure, via the third receiver module, the receive performance of the third antenna based on the signal transmitted by the base station of the wireless network, the third receiver module not being used for communication with the base station;
compare respective receive performance of the first antenna, second antenna, and third antenna;
cause, via the at least one output and based on the comparison of respective receive performance, coupling of the transceiver module to the antenna with a best respective receive performance to enable the transceiver to communicate via the antenna with the best respective receive performance;
cause, via the at least one output and based on the comparison of respective receive performance, coupling of the antenna with a next best respective receive performance to the second receiver to enable reception of subsequently transmitted signals via the antenna with the next best respective receive performance; and
cause, via the at least one output and based on the comparison of respective receive performance, coupling of the antenna with a lowest respective receive performance to the third receiver.

17. The system-on-chip as recited by claim 16, wherein the third receiver module is a multiple-input receiver module having four inputs that support reception of four respective spatial streams of information.

18. The system-on-chip as recited by claim 16, wherein the transceiver module is configured to communicate in one or more frequency bands that are different from a frequency band in which the third receiver module is configured to receive signals.

19. The system-on-chip as recited by claim 16, wherein the receive performance of the first antenna, the second antenna, or the third antenna is measured as at least one of received signal strength, receive signal quality, carrier-to-interference ratio, signal-to-noise ratio, bit-error rate, or packet-error rate.

20. The system-on-chip as recited by claim 16, wherein the transceiver module and the third receive module of the system-on-chip are configured to communicate in a same frequency band.

\* \* \* \* \*